(12) United States Patent
Rao et al.

(10) Patent No.: US 7,716,334 B2
(45) Date of Patent: May 11, 2010

(54) COMPUTER SYSTEM WITH DYNAMICALLY CONFIGURABLE CAPACITY

(75) Inventors: Shankar Prasad Venkoba Rao, Fremont, CA (US); Raymond J. Gilstrap, Milpitas, CA (US)

(73) Assignee: Oracle America, Inc., Santa Clara, CA (US)

( * ) Notice: Subject to any disclaimer, the term of this patent is extended or adjusted under 35 U.S.C. 154(b) by 2157 days.

(21) Appl. No.: 10/412,904

(22) Filed: Apr. 14, 2003

(65) Prior Publication Data

US 2003/0217153 A1 Nov. 20, 2003

Related U.S. Application Data

(60) Provisional application No. 60/381,398, filed on May 17, 2002, provisional application No. 60/381,400, filed on May 17, 2002.

(51) Int. Cl.
*G06F 15/173* (2006.01)

(52) U.S. Cl. .................... 709/226; 709/229; 705/28; 713/324

(58) Field of Classification Search .............. 709/226, 709/229; 713/324; 705/28
See application file for complete search history.

(56) References Cited

U.S. PATENT DOCUMENTS

| | | | |
|---|---|---|---|
| 5,068,851 A | 11/1991 | Bruckert et al. | |
| 5,253,184 A | 10/1993 | Kleinschnitz | |
| 5,293,556 A | 3/1994 | Hill et al. | |
| 5,404,503 A | 4/1995 | Hill et al. | |
| 5,530,946 A | 6/1996 | Bouvier et al. | |
| 5,552,999 A | 9/1996 | Polgreen et al. | |

(Continued)

FOREIGN PATENT DOCUMENTS

EP 623 900 11/1994

(Continued)

OTHER PUBLICATIONS

Hewlett Packard, White Paper, "IPMI: Intelligent Platform Management Interface," Feb. 1998, 5 pages.

(Continued)

*Primary Examiner*—Hassan Phillips
*Assistant Examiner*—Glenford Madamba
(74) *Attorney, Agent, or Firm*—Lawrence J. Merkel; Meyertons, Hood, Kivlin, Kowert & Goetzel, P.C.

(57) ABSTRACT

A computer system comprises a plurality of field replaceable units (FRUs) for supplying processing resources and a system controller. Each of the plurality of FRUs has a field replaceable unit identification (FRUID) memory adapted store a capacity-on-demand (COD) indication associated with the FRU, wherein the COD indication is indicative of whether the FRU is a base level resource or a COD resource. The system controller is configured to access the FRUID memory of each of the plurality of FRUs to detect the COD indication. Additionally, the system controller is configured to enable at least those of the plurality of FRUs for which the corresponding COD indication indicates that the FRU is a base level resource. The system controller is further configured to identify a need for additional processing resources, and is configured to enable additional ones of the plurality of FRUs responsive to identifying the need for additional processing resources.

28 Claims, 10 Drawing Sheets

U.S. PATENT DOCUMENTS

| | | | |
|---|---|---|---|
| 5,761,413 | A | 6/1998 | Frank et al. |
| 5,784,624 | A | 7/1998 | Douglass et al. |
| 5,794,065 | A | 8/1998 | Hatakeyama et al. |
| 5,867,809 | A | 2/1999 | Soga et al. |
| 5,961,215 | A | 10/1999 | Lee et al. |
| 6,016,758 | A | 1/2000 | Tomita |
| 6,058,052 | A | 5/2000 | Steadman |
| 6,070,253 | A | 5/2000 | Tavallaei et al. |
| 6,154,728 | A * | 11/2000 | Sattar et al. ............... 705/28 |
| 6,198,245 | B1 | 3/2001 | Du et al. |
| 6,249,838 | B1 | 6/2001 | Kon |
| 6,289,735 | B1 | 9/2001 | Dister et al. |
| 6,308,289 | B1 | 10/2001 | Ahrens et al. |
| 6,349,268 | B1 | 2/2002 | Ketonen et al. |
| 6,415,395 | B1 | 7/2002 | Varma et al. |
| 6,425,055 | B1 | 7/2002 | Sager et al. |
| 6,519,552 | B1 | 2/2003 | Sampath et al. |
| 6,658,586 | B1 | 12/2003 | Levi |
| 6,684,180 | B2 | 1/2004 | Edwards et al. |
| 6,708,297 | B1 | 3/2004 | Bassel |
| 6,738,748 | B2 | 5/2004 | Wetzer |
| 6,742,145 | B2 | 5/2004 | Bailey et al. |
| 6,789,214 | B1 | 9/2004 | De Bonis-Hamelin et al. |
| 6,892,159 | B2 | 5/2005 | Weiss et al. |
| 6,920,519 | B1 | 7/2005 | Beukema et al. |
| 2002/0169871 | A1 | 11/2002 | Cravo de Almeida et al. |
| 2002/0198628 | A1 * | 12/2002 | Ng et al. .................. 700/286 |
| 2003/0084359 | A1 * | 5/2003 | Bresniker et al. ........... 713/324 |
| 2003/0167273 | A1 | 9/2003 | Alexander et al. |

FOREIGN PATENT DOCUMENTS

WO        03/014752        2/2003

OTHER PUBLICATIONS

Intel, Hewlett-Packard, NEC, Dell, "-IPMI- Platrform Event Trap Format Specification," v1.0, Revision 1.0, Dec. 7, 1998, 17 pages.
Intel, Hewlett-Packard, NEC, Dell, "-IPMI- IPMB v1.0 Address Allocation," Revision 1.0, Sep. 16, 1998, 5 pages.
Intel, Hewlett-Packard, NEC, Dell, "-IPMI- Platrform Management FRU Information Storage Definition," v1.0, Revision 1.1, Sep. 27, 1999, 27 pages.
Atmel Corporation, "2-Wire Serial EEPROM," Rev. 03361-SEEPR-07/02, 19 pages.
Atmel Corporation, "Interfacing 24CXX Serial EEPROMs," Rev. 0507D-05/01, 3 pages.
Atmel Corporation, "Atmel's Serial EEPROMs, Solutions for all your design needs," Jan. 1999, 7 pages.
Ideas International Pty., Ltd., "Sun-ft-SPARC," Competitive Profiles, Jan. 27, 1999, 2 pages.
Sun Microsystems, Inc., "Netra ft 1800 Module EEPROM v.4 Data File Specifications," 1998, 56 pages.
Sun Microsystems, Inc., "Netra ft 1800 Module EEPROM v.4 Data File Specifications, Repair and Reference Fields," 1998, 32 pages.
Sun Microsystems, Inc., "Netra ft 1800 Module EEPROM v.4 Data File Specifications, RMM-Specific Data," 1998, 4 pages.
Sun Microsystems, Inc., "Netra ft 1800 Module EEPROM v.4 Data File Specifications, PCI Card-Specific Data," 1998, 4 pages.
Sun Microsystems, Inc., "Netra ft 1800 Module EEPROM v.4 Data File Specifications, Disk Chassis-Specific Data," 1998, 4 pages.
Sun Microsystems, Inc., "Netra ft 1800 Module EEPROM v.4 Data File Specifications, Motherboard-Specific Data," 1998, 6 pages.
Sun Microsystems, Inc., "Netra ft 1800 Module EEPROM v.4 Data File Specifications, CPUset-Specific Data," 1998, 9 pages.
Sun Microsystems, Inc., "Netra ft 1800 Module EEPROM v.4 Data File Specifications, Generic Data-All Modules," 1998, 20 pages.
"eeprom—display or alter information in a hardware module's eeprom," facsimile received on Jan. 31, 2003, printed on May 19, 1993. 2 pages.
JP2002250578, Abstract, "Refrigerating Container," Sep. 6, 2002, 5 pages.
William K. Hogan, et al., "SMT Connectors for Removable Small-Form-Factor Transceiver Modules," 2000 Electronic Components and Technology Conference, IEEE, pp. 1164-1172.
Lisa Spainhower, et al., Design for Fault-Tolerant in System ES/9000 Model 900, 1992 IEEE, pp. 38-47.
P.L. Hunter, et al., "Fault Tolerant, Hot-Pluggable Power System Design," 1994 IEEE, pp. 815-822.
"On-Field Replaceable Unit Identification and Error Storage," IBM Technical Disclosure Bulletin, Sep. 1, 1994, vol. 37, Issue 9, 3 pages.
"Data Mining 101," aboutAI.net, Aug. 6, 2000, 3 pages.
Microsoft Computer Dictionary, Copyright 2002, Microsoft Press, Fifth Edition, p. 575.
Perl for System Administration by David Blank-Edelman, Published by O'Reilly 2000, ISBN:1565926099.
Engineering Statistics Handboo, http://www.itl.nist.gov/div898/handbook/apr/section2/apr234.htm, Oct. 29, 2000 version found via the Way Back Machine.
Engineering Documentation Control Handbook ($2^{nd}$ Edition) by F.B. Watts, Published by William Andrew Publishing/Noyes 2000, ISBN:0-8155-1446-8.
Nebraska Dept. of Education General Glossary, http://www.nde/state/ne/us/READ/FRAMEWORK/glossary/general_p-t.html, Jan. 29, 2002 version found via the Way Back Machine.

* cited by examiner

COMPUTER SYSTEM WITH DYNAMICALLY CONFIGURABLE CAPACITY

This patent application claims benefit of priority to U.S. Provisional Patent Application Ser. No. 60/381,398, filed May 17, 2002. This patent application claims benefit of priority to U.S. Provisional Patent Application Ser. No. 60/381, 400, filed May 17, 2002. The above applications are incorporated herein by reference in their entirety.

BACKGROUND OF THE INVENTION

1. Field of the Invention

This invention relates generally to a processor-based computer system and, more particularly, to a computer system with dynamically configurable capacity (i.e., capacity-on-demand).

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as the functionality, reliability, scalability, and performance of such systems.

One example of a processor-based system used in a network-centric environment is a mid-frame server system. Typically, mid-frame servers are employed in high bandwidth systems requiring high availability factors. Minimizing system downtime is an important system management goal, as downtime generally equates to significant lost revenue. Typically, such computer systems are provided with replaceable components or modules that may be removed and/or installed without shutting down the system. This on-line replacement capability is commonly referred to as hot-pluggable or hot-swappable environment.

Unlike current desktop computer systems, in which the internal cards and devices are essentially disposable (i.e., they are replaced if they fail, and the defective part is discarded without repair), the individual components used to construct higher end systems, such as the mid-frame server described above, are typically returned to the manufacturer or a third-party vendor associated with the manufacturer for repair. Repaired units are then reinstalled in the same or in a different mid-frame server. These units are commonly referred to as field replaceable units (FRUs). In the service life of a particular FRU, it may be installed in multiple servers owned by different customers. Exemplary units that may be field replaceable, are system control boards, processing boards, memory modules installed on one of the processing boards, input/output (I/O) boards, power supplies, cooling fans, and the like.

Mid-frame servers are employed in high availability, high utilization applications. When a system is installed the processing demands on the server are estimated and the appropriate processing resources are provided. These resources include the number of processing boards, the number of processors on each board, and the like. The different processing boards may be subdivided into separate logical domains, so not only do the resource requirements for the entire server need to be determined, but also the resource requirements for each of the logical domains needs to be determined. In determining the processing requirements, there is a trade-off between meeting the average load and meeting the peak load. It is generally not economical for a server owner to purchase the level of over-capacity required to meet all peak load scenarios. Hence, there may be times when the server becomes overloaded during peak load periods. This may result in a slow-down in the system and/or delays in customer servicing.

SUMMARY OF THE INVENTION

In one embodiment, a method is contemplated. A plurality of field replaceable units (FRUs) are provided for supplying processing resources. Each FRU has a field replaceable unit identification (FRUID) memory adapted to store a capacity-on-demand (COD) indication associated with the FRU, wherein the COD indication is indicative of whether the FRU is a base level resource or a COD resource. A subset of the plurality of FRUs are enabled, wherein the FRUs in the subset have COD indications indicating that the FRUs are base level resources. A need for additional processing resources is identified, and additional ones of the plurality of FRUs are enabled responsive to identifying the need for additional processing resources.

In some embodiments, a computer system comprises a plurality of field replaceable units (FRUs) for supplying processing resources and a system controller. Each of the plurality of FRUs has a field replaceable unit identification (FRUID) memory adapted store a capacity-on-demand (COD) indication associated with the FRU, wherein the COD indication is indicative of whether the FRU is a base level resource or a COD resource. The system controller is configured to access the FRUID memory of each of the plurality of FRUs to detect the COD indication. Additionally, the system controller is configured to enable at least those of the plurality of FRUs for which the corresponding COD indication indicates that the FRU is a base level resource. The system controller is further configured to identify a need for additional processing resources, and is configured to enable additional ones of the plurality of FRUs responsive to identifying the need for additional processing resources.

In other embodiments, a system comprises a capacity-on-demand server and a computer system communicatively coupled to the capacity-on-demand server. The computer system comprises the plurality of field replaceable units (FRUs) described above, and the system controller. The system controller is configured to access the FRUID memory of each of the plurality of FRUs to detect the COD indication, wherein the system controller is configured to enable at least those of the plurality of FRUs for which the corresponding COD indication indicates that the FRU is a base level resource. The system controller is further configured to identify a need for additional processing resources, and to transmit a request for additional processing resources to the capacity-on-demand server. The system controller is configured to receive an authorization message from the capacity-on-demand server responsive to the request, and is configured to enable additional ones of the plurality of FRUs responsive to the authorization message.

BRIEF DESCRIPTION OF THE DRAWINGS

The invention may be understood by reference to the following description taken in conjunction with the accompanying drawings, in which like reference numerals identify like elements, and in which.

Figure 1:
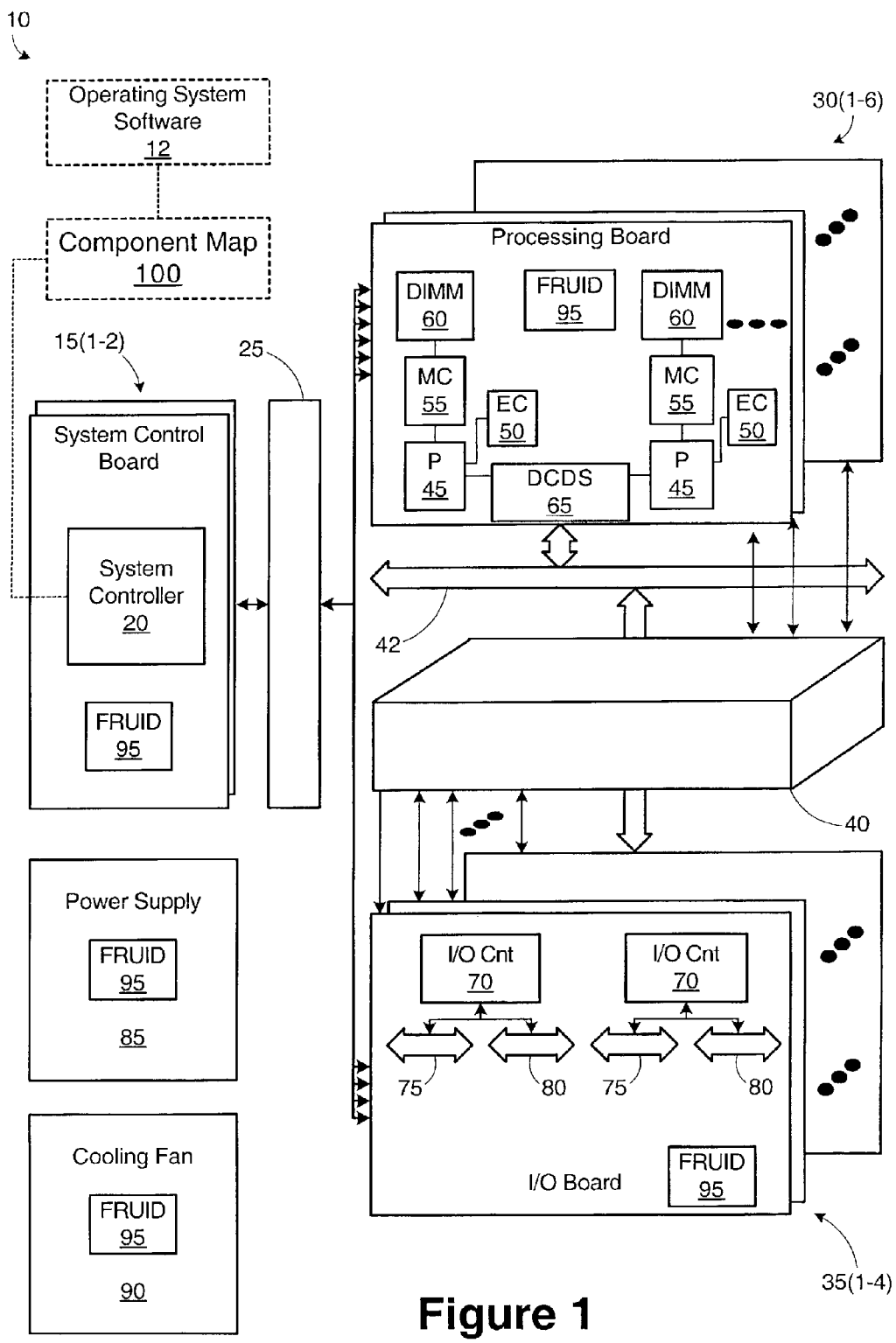
FIG. 1 is a simplified block diagram of a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the invention and corresponding detailed description are presented in terms of software, or algorithms and symbolic representations of operations on data-bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, and/or magnetic signals capable of being stored, transferred, combined, compared, and otherwise manipulated. It has proven convenient at times, principally for reasons of common usage, to refer to these signals as bits, values, elements, symbols, characters, terms, numbers, and the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" and the like, refer to the action and processes of a computer system, or similar electronic computing device, that manipulates and transforms data represented as physical, electronic quantities within the computer system's registers and/or memories into other data similarly represented as physical quantities within the computer system memories and/or registers and/or other such information storage, transmission and/or display devices.

The programming instructions necessary to implement these software functions may be resident on various storage devices. Such storage devices referred to in this discussion may include one or more machine-readable storage media for storing data and/or instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, and/or modules in the various systems may be stored in respective storage devices. The instructions when executed by a respective control unit cause the corresponding system to perform programmed acts as described.

Referring now to FIG. 1, a block diagram of a system 10 in accordance with one embodiment of the present invention is illustrated. In the illustrated embodiment, the system 10 is adapted to run under an operating system 12, such as the Solaris™ operating system offered by Sun Microsystems, Inc. of Santa Clara, Calif.

The system 10, in one embodiment, includes a plurality of system control boards 15(1-2), each including a system controller 20, coupled to a console bus interconnect 25. The system controller 20 may include its own microprocessor and memory resources. The system 10 also includes a plurality of processing boards 30(1-6) and input/output (I/O) boards 35(14). The processing boards 30(1-6) and I/O boards 35(1-4) are coupled to a data interconnect 40 and a shared address bus 42. The processing boards 30(1-6) and I/O boards 35(1-4) also interface with the console bus interconnect 25 to allow the system controller 20 access to the processing boards 30(1-6) and I/O boards 35(1-4) without having to rely on the integrity of the primary data interconnect 40 and the shared address bus 42. This alternative connection allows the system controller 20 to operate even when there is a fault preventing main operations from continuing.

In the illustrated embodiment, the system 10 is capable of supporting six processing boards 30(1-6) and four I/O boards 35(1-4). However, the invention is not limited to such an individual implementation, as any number of such resources may be provided. Also, the invention is not limited to the particular architecture of the system 10.

For illustrative purposes, lines are utilized to show various system interconnections, although it should be appreciated that, in other embodiments, the boards 15(1-2), 30(1-6), 35(1-4) may be coupled in any of a variety of ways, including by edge connectors, cables, and/or other available interfaces.

In the illustrated embodiment, the system 10 includes two control boards 15(1-2), one for managing the overall operation of the system 10 and the other for providing redundancy and automatic failover in the event that the other board 15(1-2) fails. Although not so limited, in the illustrated embodiment, the first system control board 15(1) serves as a "main" system control board, while the second system control board 15(2) serves as an alternate hot-swap replaceable system control board.

The main system control board 15(1) is generally responsible for providing system controller resources for the system 10. If failures of the hardware and/or software occur on the main system control board 15(1) or failures on any hardware control path from the main system control board 15(1) to other system devices occur, system controller failover software automatically triggers a failover to the alternative control board 15(2). The alternative system control board 15(2) assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1-2). During any given moment, generally one of the two system control boards 15(1-2) actively controls the overall operations of the system 10. Accordingly, the term "active system control board," as utilized hereinafter, may refer to either one of the system control boards 15(1-2), depending on the board that is managing the operations of the system 10 at that moment.

For ease of illustration, the data interconnect 40 is illustrated as a simple bus-like interconnect. However, in an actual implementation the data interconnect 40 is a point-to-point switched interconnect with two levels of repeaters or switches. The first level of repeaters is on the various boards 30(1-6) and 35(1-4), and the second level of repeaters is resident on a centerplane (not shown). The data interconnect 40 is capable of such complex functions as dividing the system into completely isolated partitions, and dividing the system into logically isolated domains, allowing hot-plug and unplug of individual boards.

In the illustrated embodiment, each processing board 30(1-6) may include up to four processors 45. Each processor 45 has an associated e-cache 50, memory controller 55 and up to eight dual in-line memory modules (DIMMs) 60. Dual CPU data switches (DCDS) 65 are provided for interfacing the processors 45 with the data interconnect 40. Each pair of processors 45 (i.e., two pairs on each processing board 30(1-6)) share a DCDS 65. Also, in the illustrated embodiment, each I/O board 35(1-4) has two I/O controllers 70, each with one associated 66-MHz peripheral component interface (PCI) bus 75 and one 33-MHz PCI bus 80. The I/O boards 35(1-4) may manage I/O cards, such as peripheral component interface cards and optical cards, that are installed in the system 10.

In the illustrated embodiment, the processors 45 may be UltraSPARCIII™ processors also offered by Sun Microsystems, Inc. The processors are symmetric shared-memory multiprocessors implementing the UltraSPARC III protocol. Of course, other processor brands and operating systems 12 may be employed.

Selected modules in the system 10 are designated as field replaceable units (FRUs) and are equipped with FRU identification memories (FRUID) 95. Exemplary FRUs so equipped may include the system controller boards 15(1-2), the processing boards 30(1-6), and the I/O boards 35(1-4). The system 10 may also include other units, such as a power supply 85 (interconnections with other devices not shown), a cooling fan 90, and the like, equipped with FRUIDs 95, depending on the particular embodiment.

Figure 2:
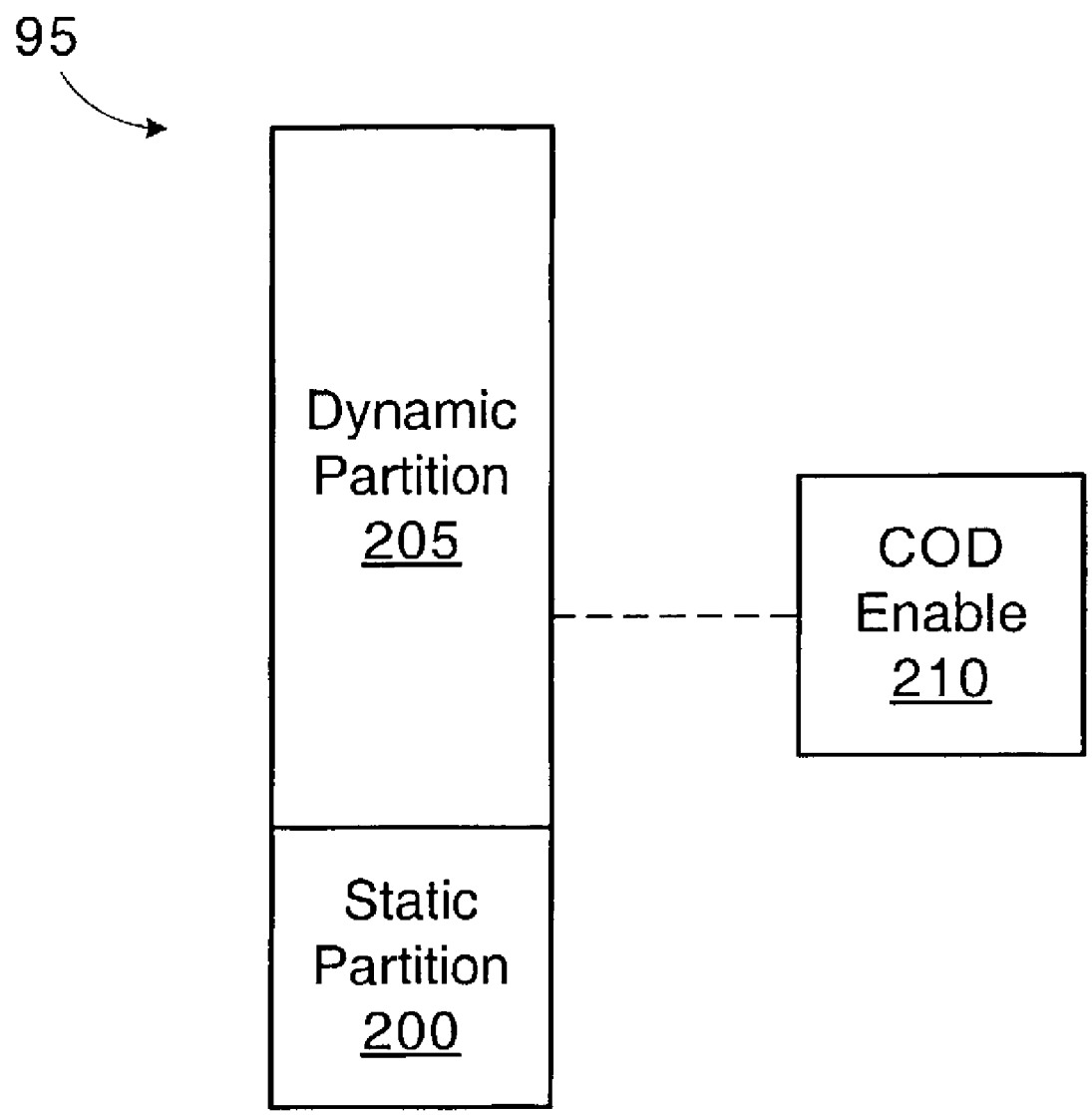
FIG. 2 is a diagram of a field replaceable unit identification memory (FRUID)

Turning now to FIG. 2, a simplified diagram of the FRUID 95 is provided. In the illustrated embodiment, the FRUID 95 is a serial electrically erasable programmable read only memory (SEEPROM) and has an 8 Kbyte space to store information about the associated FRU. Of course other memory types and storage sizes may be used depending on the particular implementation. The FRUID 95 includes a 2 Kbyte static partition 200 dedicated to store "static" information and a 6 Kbyte dynamic partition 205 to store "dynamic" information.

The static information includes:
  Manufacturing Data, such as part number, serial number, date of manufacture, and vendor name;
  System ID Data, such as Ethernet address and system serial number; and
  System Parameters (e.g., maximum speed, DIMM speed, and maximum power, and the like).
The dynamic information includes:
  Operational History Data, such as hours of operation, number of power-ons, temperature log;
  System configuration data, such as slot number and FRU hierarchy;
  Physical Location Data, such as location of data center, latitude, longitude, and altitude;
  Field Repair Data; and
  Symptom and Diagnosis Data captured on a fault occurrence.

The particular format for storing data in the FRUID 95 is described in greater detail in U.S. Provisional Patent Application Ser. No. 60/381,400, incorporated above.

Some of the benefits derived from the information stored in the FRUID 95 are:
  Fatal Error Identification—a fatal error bit may be set on FRU failure and will remain set until after the FRU has been repaired and reset by the repair depot to prevent "accidental" reuse of the failed FRU;
  Ease of Tracking Errors—in the event the FRU has been "repaired" and returned to the field, and failed again subsequently with the same or similar failure, the failure log is tagged to insure special attention will be given to the failed FRU;
  Trend Analysis—quick identification of certain batch of FRUs with known defects can be done by a serial number embedded into the SEEPROM;
  Trend Analysis—quick analysis can be performed by collecting information of specific FRUs, including power-on hours, temperature logs, and the like;
  Trend Analysis—quick identification of components from specific vendors on pre-mature failures of certain FRUs; and
  Field Change Orders can be applied easily with patches after identifying the range of affected FRU by serial numbers.

In one embodiment, the dynamic partition 205 includes a capacity-on-demand (COD) enable indication 210. The COD enable indication may be used to identify which FRUs (or submodules, if the FRUID 95 is on a submodule of a FRU) are provided as part of a base level system that the customer has purchased ("base-level resources") or is provided as additional resources for providing COD functionality ("COD resources"). In one implementation, the COD enable indication may be a bit indicative, when set, that the FRU is a COD resource and indicative, when clear, that the FRU is a base level resource. Other embodiments may reverse the meaning of the set and clear states, or may use multi-bit indications, as desired. Additional details are provided below.

The system 10 is adapted to store a component map 100 (see FIG. 1) of the components in the system 10. The component map 100 details the submodules associated with the associated FRUs, and includes enable bits for selected FRUs and submodules to allow enabling and/or disabling of the FRUs or submodules for various purposes. The component map 100 may be accessed under direction from a user or a software application to assert or de-assert the enable bits for a particular submodule.

Figure 3:
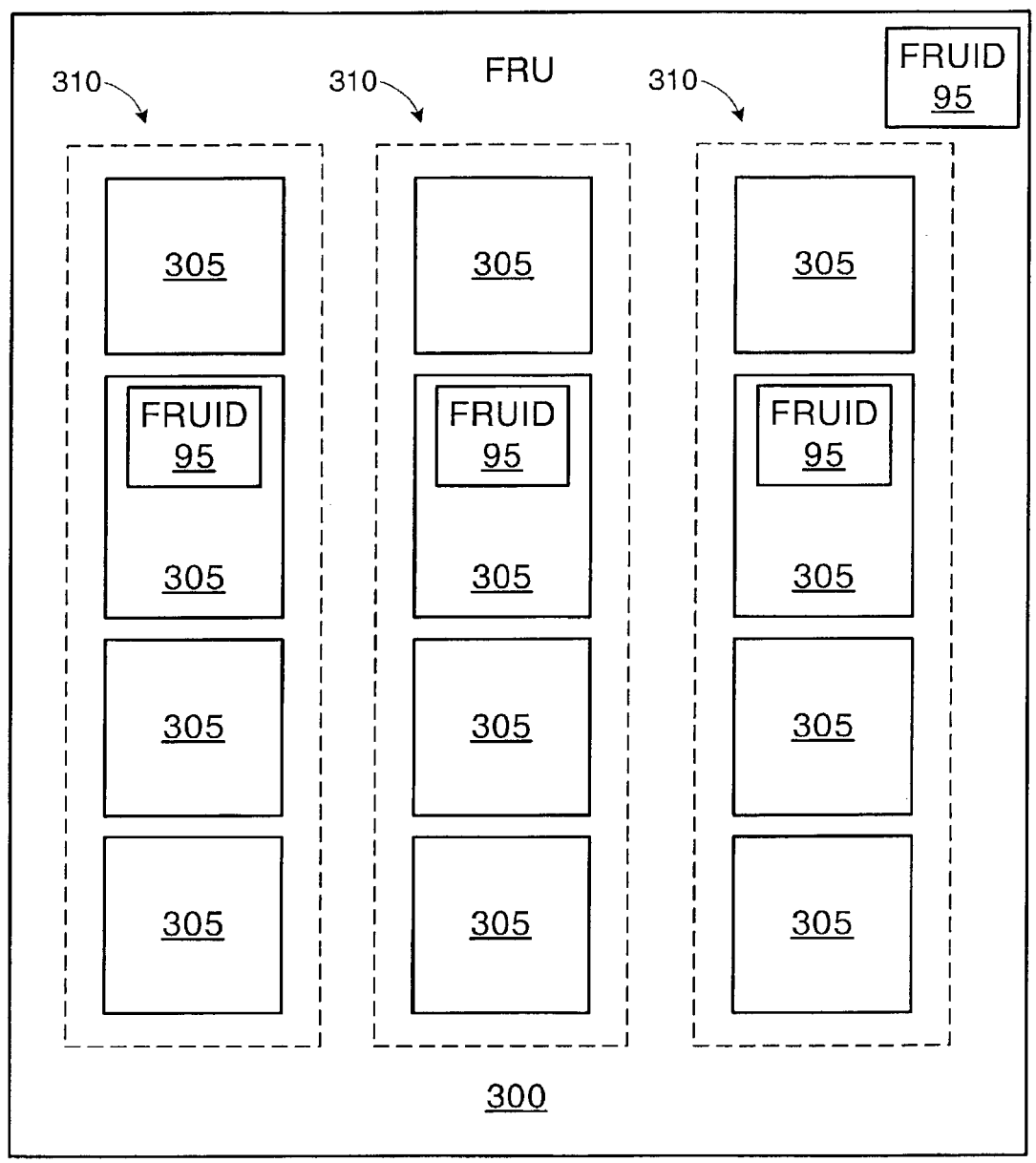
FIG. 3 is a simplified block diagram illustrating a field replaceable unit (FRU) having a plurality of submodules.

Referring now to FIG. 3, a simplified block diagram of an exemplary FRU 300 having a FRUID 95 is shown. As described above, the FRU 300 may represent one of the system control boards 15(1-2), one of the processing boards 30(1-6), one of the input/output (I/O) boards 35(1-4), the power supply 85, the cooling fan, and the like. The FRU 300 includes a plurality of submodules 305. For example, the FRU 300 may be a processing board 30(1-6), and the submodules 305 may be the processors 45, e-caches 50, memory controllers 55, and DIMMs 60. Selected submodules 305 (e.g., the DIMMS 60) may also be themselves field replaceable and have their own FRUIDs 95. The submodules 305 may be organized into groups 310. For example, a processor 45 and its associated e-cache 50, memory controller 55, and DIMMS 60 may be organized into a single group 310.

Figure 4:
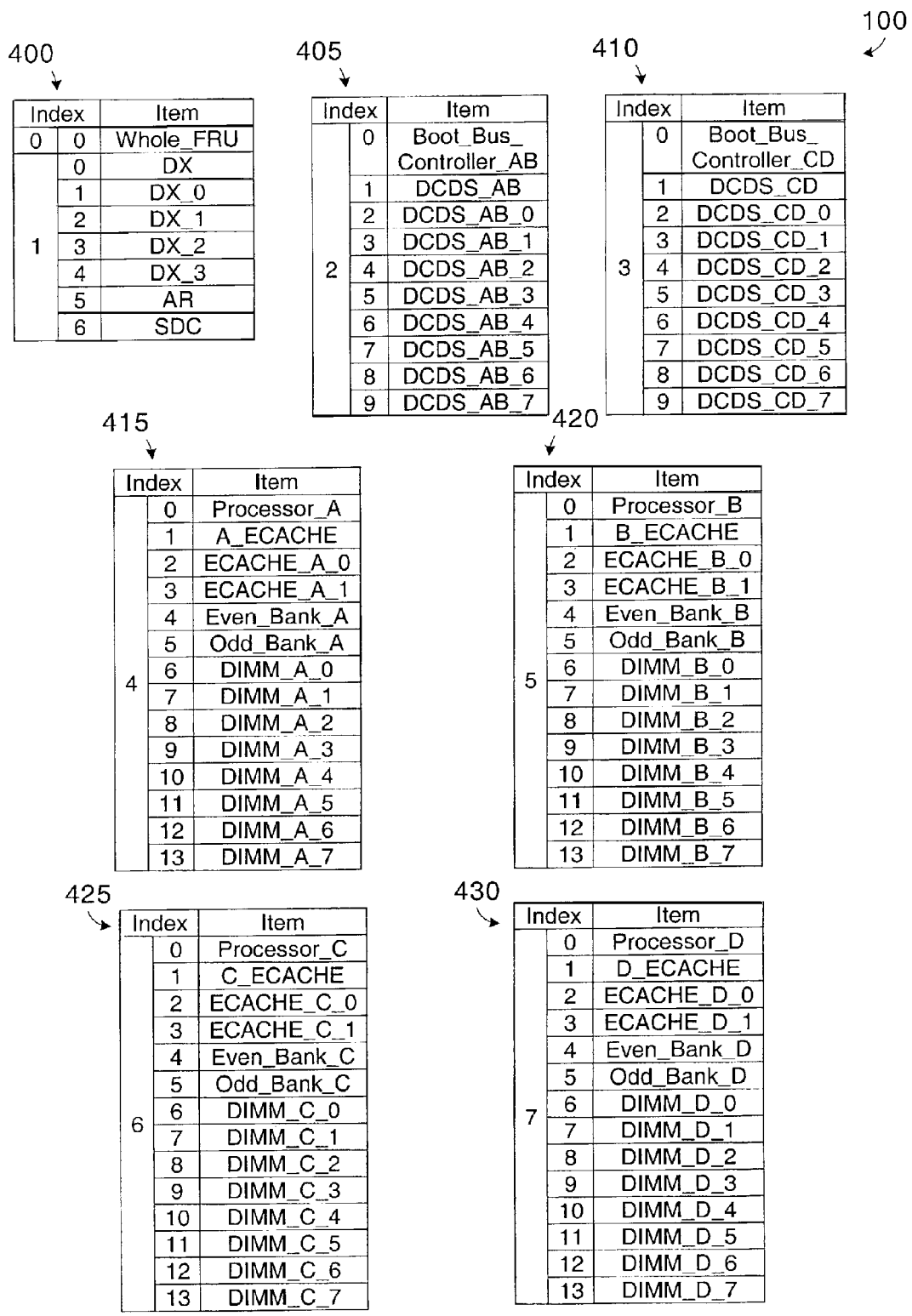
FIG. 4 is a diagram of a component map resident on the FRUID of FIG. 3.

The following example, described with reference to FIG. 4, illustrates the construct of an exemplary component map 100. FIG. 4 illustrates a representation of the content of the component map 100, not the actual data stored in the component map 100. The component map 100 is organized into 7 subgroups 400-430. The subgrouping 400 is related to the data repeaters (DX), address repeaters (AR), and system data controller (SDC—which implements control for the repeaters and a console bus multiplexer). The subgroups 405, 410 are associated with boot bus controllers (not shown) and dual CPU data switches (DCDS) 65. The subgroups 415, 420, 425, 430 are each associated with one of the processors 45 and associated e-caches 50, memory controllers 55, and DIMMs 60. The byte locations, specified by the index fields in the subgroups 400-430 represent the locations of enable bits for each of the components within the component map 100.

In the illustrated embodiment, the component map 100 may be employed to provide configurable capacity for the system, also referred to as capacity-on-demand. COD may be provided at any level in the hierarchy. For example, some FRUs may be base level resources, and other FRUs may be COD resources. Alternatively, or in addition, submodules of the FRUs may be either base level resources or COD resources. As mentioned above, the COD enable indication in the FRUID 95 may be used to indicate whether or given FRU (or submodule) is a base level resources or a COD resource.

During the manufacture or installation of the system 10, a portion of the FRUs or submodules may be indicated as base level resources, and the remaining FRUs or submodules may be supplied as COD resources. The manufacturer may use the COD indications in the FRUIDs 95 to indicate which resources are base level resources and which resources are COD resources, depending on the base level configuration selected by the customer. Any portion of the system 10 having a corresponding FRUID 95 may be categorized as a base level resource or COD resource. Thus, the customer may have flexibility in the amount of resources purchased in the base level system. The COD resources may then be available to supply additional processing resources on demand. For example, one or more processing boards 30(1-6) may be base level resources and remaining processing boards 30(1-6) may be COD resources. Alternatively or in addition, all of the processors 45 on a selected processing board 30(1-6) may be populated, but only a subset of the processors 45 may be indicated as base level resources (via the COD enable indications), and this subset may be enabled on the component map 100. For example, two processors 45 and their associated e-caches 50, memory controllers 55, and DIMMs 60 may be enabled. The customer pays a reduced price for the system 10 as compared to the price if all four processors 45 were enabled. The price may be the same price as a two processor system 10, or a premium may be added for the capacity-on-demand capability.

When a need for increased capacity is encountered, as described in greater detail below, the component map 100 is accessed to increase the resources available to the system 10 (e.g., by enabling more processors 45), and the user of the system 10 is charged a premium for using the additional capacity.

This same capacity structure may also be used on different levels. For example, all the processing boards 30(1-6) may be fully populated, with only of a subset of the processing boards 30(1-6) being enabled. Also, the capacity-on-demand feature may be applied to controlling memory resources. Only a subset of the DIMMs 60 may be enabled for a particular processor 45 (i.e., maintaining any required bank symmetries).

Capacity configuration may also apply to the I/O boards 35(1-4) and/or devices installed thereon. A component map 100 including one of the I/O boards 35(1-4) may have entries for each of the buses 75, 80 and for individual slots on the buses 75, 80. The I/O bandwidth of the system 10 may be dynamically configured by selectively enabling devices installed in the slots of the buses 75, 80 of the I/O boards 35(1-4).

In the illustrated embodiment, there are different scenarios contemplated for controlling the capacity configuration process. The user of the system 10 may manually initiate a capacity increase, or the system controller 20 may autonomously initiate a capacity increase. The system controller 20 may generate the component map 100 by accessing the part number and serial number information stored on the respective FRUIDs 95 during configuration of the system 10.

Regarding the manual initiation process, the user of the system 10 may request a capacity increase if a high processing load is observed or expected in the future. For example, if the user of the system 10 is planning a new product release or media campaign, an increased load may be predictable. The user of the system 10 may request a capacity increase prior to the predicted increase in load. Also, if the user of the system 10, in monitoring the load on the system 10, identifies that the system is operating at near capacity levels, a request for increased capacity may be made.

If an automatic capacity configuration process is desired, the system controller 20 may monitor the resource demands on the system 10 and automatically increase the capacity by enabling additional resources (e.g., processing boards 30(1-6), number of processors 45 on a given processing board 30(1-6), DIMMs 60, I/O devices 70, etc.) as conditions warrant. For example, the system controller 20 may be adapted to monitor peak and average processing loads. If the average load reaches a certain percentage of maximum (e.g., 80%), the system controller 20 initiates a request to increase capacity. The user of the system 10 may specify the average processing load and a threshold for requesting additional resources.

The system controller 20 is configured to reconfigure the system 10 when the additional capacity is enabled. The system controller 20 implements an automatic system reconfiguration. In the illustrated embodiment, there are two types of automatic system reconfiguration actions, simple and partial. A simple automatic system reconfiguration involves enabling or disabling a device (e.g., the entire FRU 300) from the system configuration. A partial automatic system reconfiguration, involves partial reconfiguration of individual components on a board 30(1-6), 35(1-4) (e.g., a group 310 or individual submodule 305). The system controller 20 may implement the reconfigurations by setting enable bits in the component map 100.

Figure 5:
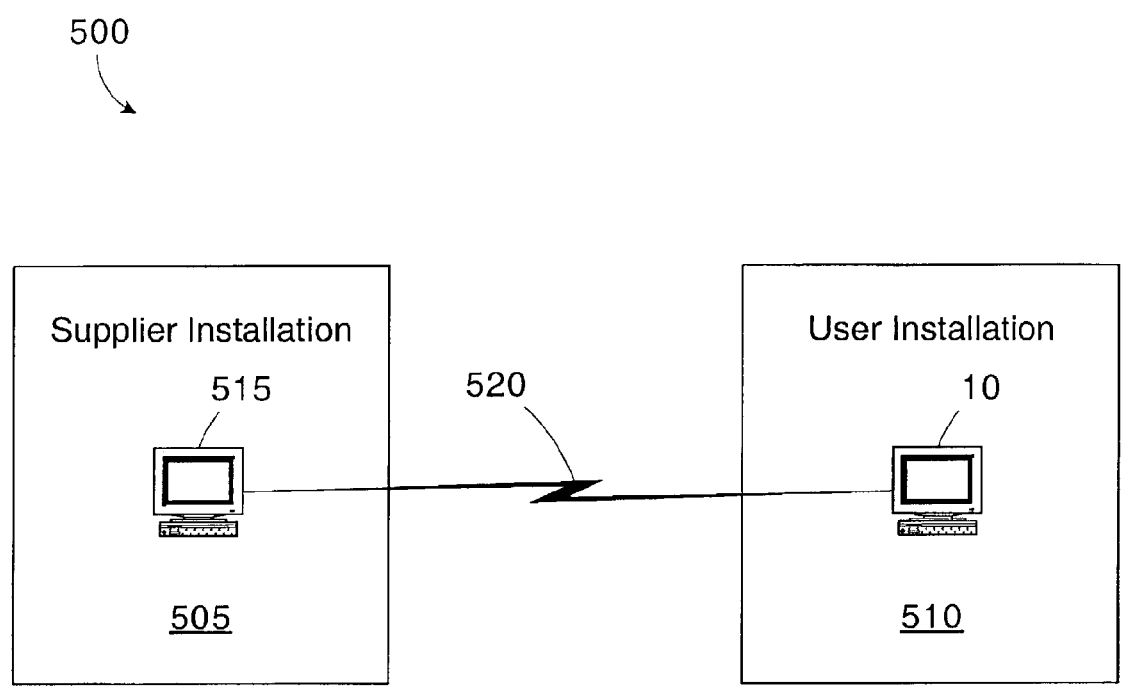
FIG. 5 is a simplified block diagram of a network for communicating capacity-on-demand transactions between a supplier installation and a user installation in accordance with another embodiment of the present invention.

In addition to the various capacity increase initiation methods, there are also various techniques that may be employed for responding to the requests and tracking billing information for the user on the system 10. FIG. 5 illustrates a network 500 for communicating between a supplier installation 505 and a user installation 510. The supplier installation 505 includes a capacity of demand (COD) server 515 adapted to receive COD requests from the system 10 at the user installation 510 through a connection 520, such as a secure internet connection or a dial-up modem connection. The request is initiated by a user or the system controller 20 (see FIG. 1). The COD server 515 may send an authorization message, including a key for accessing the component map 100, for enabling additional resources. The COD server 515 could then track any fees owed by the user of the system 10 for the additional capacity.

In one embodiment, the additional resources may be enabled indefinitely until a request to reset the capacity is received, or in another embodiment, the capacity increase may have a limited time interval, and the system 10 may automatically reset the capacity upon expiration of the time interval.

Figure 6:
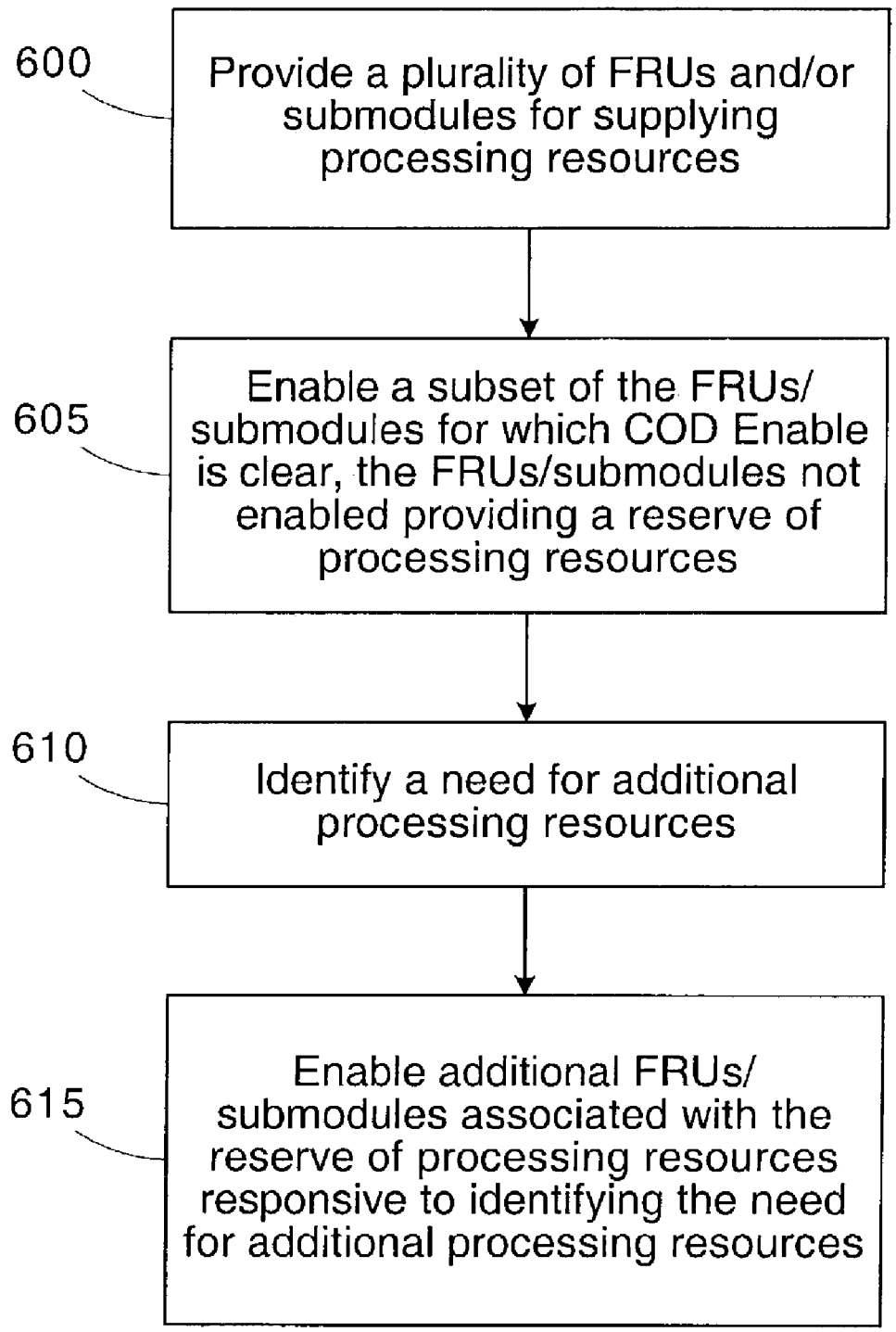
FIG. 6 is a simplified flow diagram of a method for providing a computer system with dynamic capacity configurability in accordance with yet another embodiment of the present invention.

Referring now to FIG. 6, a simplified flow diagram of a method for providing a computer system with dynamic capacity configurability in accordance with another embodiment of the present invention is provided. In block 600, a plurality of FRUs and/or submodules for supplying processing resources is provided. Exemplary submodules include processors, memory devices, input/output devices, and the like. In block 605, a subset of the FRUs/submodules are enabled. That is, the FRUs/submodules having corresponding COD indications indicating that the FRUs/submodules are base level resources may be enabled (e.g. COD enable bit clear). The FRUs/submodules that are not enabled (having corresponding COD indications indicating that they are COD resources, such as a COD enable bit that is set) provide a reserve of processing resources. In block 610, a need for additional processing resources is identified. The identification may be conducted manually by a user of the system 10 or automatically by the system controller 20. In block 620, additional FRUs/submodules associated with the reserve of processing resources are enabled responsive to identifying the need for additional processing resources. More particularly, in one embodiment, the FRUID information identifies the type of resources on that FRU. The system controller 20 may locate currently disabled FRUs that may provide the desired additional processing resources, and may enable one or more of such FRUs. The information identifying the capabilities may include the vendor name, part number, etc. from the static partition of the FRUID, for example, and may be indicated in the component map 100 as processors, memory, I/O devices, etc.

Figure 7:
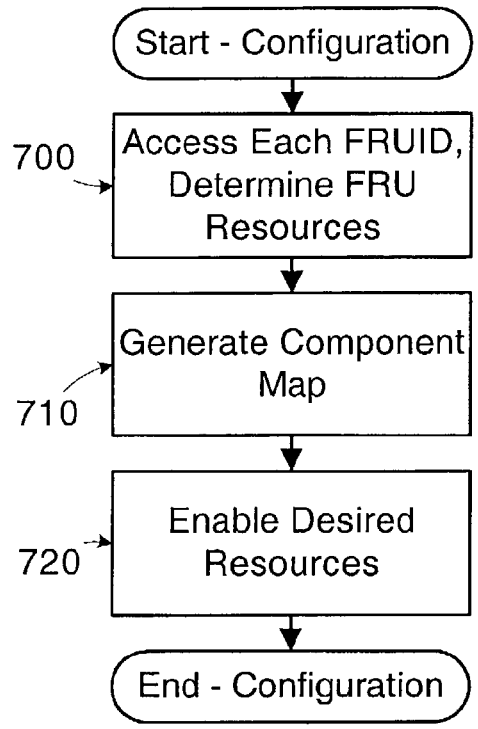
FIG. 7 is a simplified flow diagram of one embodiment a method during configuration of the system shown in FIG. 1.

Referring now to FIG. 7, a flow diagram of one embodiment of a method that may be used during configuration of the system 10 is shown. For example, the method may be implemented in software executed by the system controller 20. As mentioned above, the system controller 20 may access the FRUIDs 95 of the modules in the system 10 to generate the component map 100. This operation is illustrated as blocks 700 and 710 in FIG. 7. That is, the system controller 20 may read each FRUID (on each FRU or submodule) to determine the identity of the FRU (e.g. using the manufacturing data such as the part number, vendor name, etc.) and thus the resources included on the FRU (block 700). The system controller 20 may generate the component map 100 based on the information read from the FRUIDs (block 710). The system controller 20 may enable the desired resources in the component map (block 720). Block 720 may also be performed at other times to change the capacity of the system 10 (e.g. providing the COD features described above). During configuration, the system controller 20 may enable those FRUs/submodules for which the COD indication indicates that the FRU/submodule is a base level resource. For each FRU/submodule indicated as a COD resource, the system controller 20 may first determine if the FRU is to be enabled (e.g. if use of the FRU has been paid for by the user). Licensing information may be stored in a secure location by the system controller 20 to indicate whether or not the FRU is to be enabled, for example. If the COD resource is to be enabled, the system controller 20 also enables the COD resource. At other times, the COD resource may be enabled after obtaining an additional license (e.g. using the system of FIG. 5).

Figure 8:
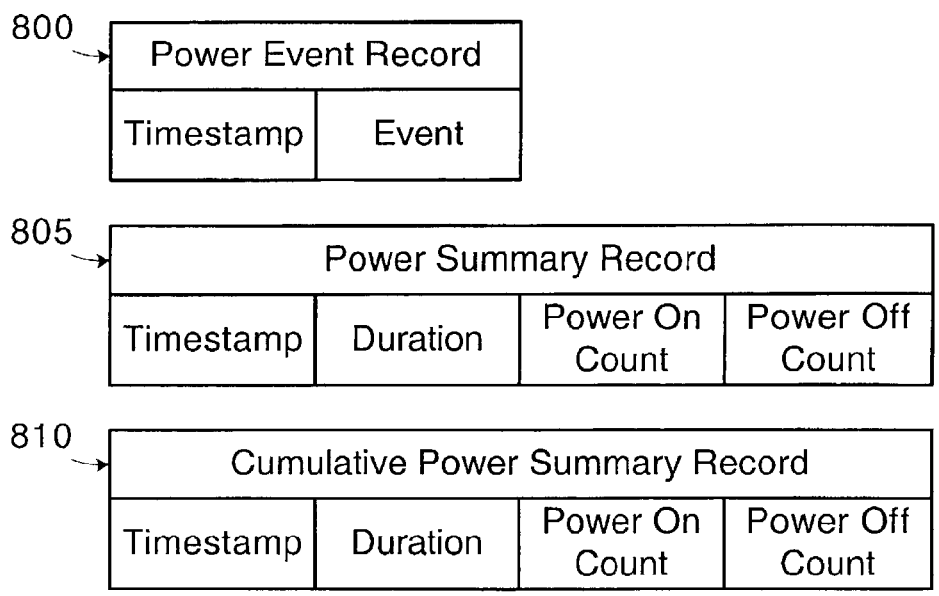
FIG. 8 is a block diagram illustrating one embodiment of power records that may be stored in one embodiment of the FRUID memory.

Turning next to FIG. 8, one embodiment of the power data that may be part of one embodiment of the operational history data described above. The power data may include one or more of power event records 800, a power summary record 805, and a cumulative power summary record 810. The power event records 800 are created when a power on or a power off event occurs. The power on and off event records 800 are stored in a circular buffer arrangement. A "still on" record is also created periodically indicating the FRU 300 is activated. When a "still on" power event record is created it does not advance the circular buffer after each record. Rather, the "still on" record is rewritten in the same location by indexing the circular buffer index after each record is generated. During a controlled power off, the "still on" record is overwritten by the power off event record. In the case of an uncontrolled power off, the last "still on" record remains in the FRUID 95. A subsequent power on record is generated in a new buffer location when the FRU 300 is re-powered. The persistent "still on" record provides an approximation of the actual time of the uncontrolled power off. Power event records 800 include a timestamp field that records the date and time the event occurred, and an event field that specifies the type of event (power on, power off, or still on).

The power summary record 805 is updated during power on events, power off events, and periodically while the FRU 300 is activated. The power summary record 805 tracks part usage and idle time and can be used to calculate mean time before failure values. The power summary record 805 includes a timestamp field, a duration field specifying the total time the FRU 300 has been powered on, a power on count field, and a power off count field.

The cumulative power summary record 810 is updated whenever a FRU 300 is repaired (i.e., at a repair depot). The information in the power summary record 805 associated with the FRU 300 in the previous installation (i.e., prior to failure) is aggregated with previous power summary records 805 from previous installations. Subsequently, the power event records 800 and power summary record 805 are cleared. The cumulative power summary record 810 includes the same fields as the power summary record 805, but its duration is indefinite, unlike the power summary record 805, which is only retained for a particular installation.

Figure 9:
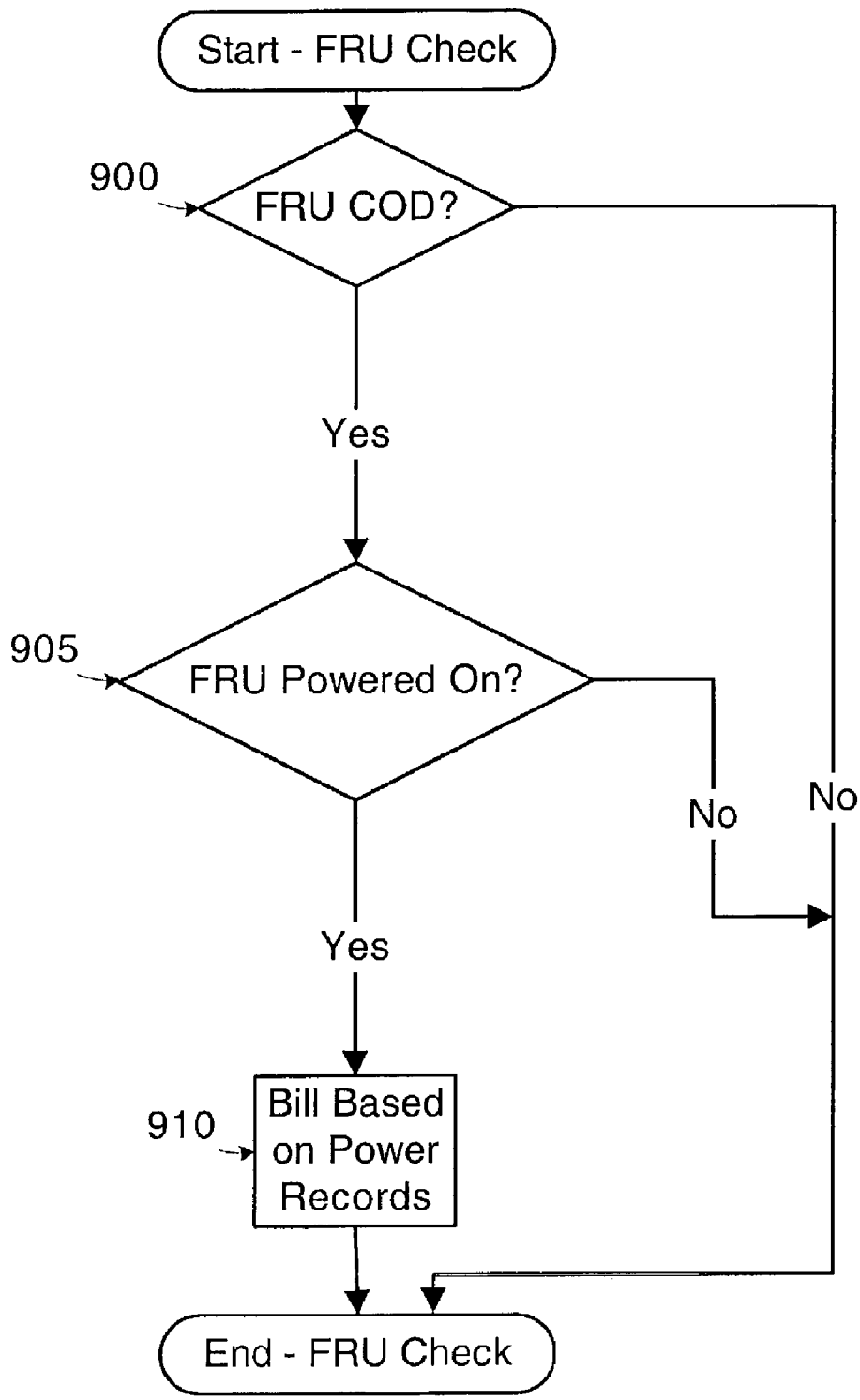
FIG. 9 is a flow diagram of one embodiment of a method for checking a COD FRU for billing purposes.

The power data may be used in various fashions in conjunction with the COD mechanism described above. For example, if a given FRU (or module on a FRU that has its own FRUID) is a COD resource, the FRU (or module) may not be powered on. The power data may thus be an indicator of the usage of the FRU, and may be used for billing purposes. FIG. 9 is a flow diagram illustrating one embodiment of a method for checking a COD FRU for billing purposes. The method may be performed at any time (e.g. by the system controller 20, either automatically or at the request of a COD server). The method may also be performed when a FRU is returned or at a repair depot when a FRU is serviced. The method will be described in terms of checking a FRU, although a module on the FRU having its own FRUID may be checked in a similar fashion.

The method may include determining if the FRU is a COD FRU (decision block 900) That is, the method may include checking the COD indication corresponding to the FRU to see if the FRU is a COD resource or a base level resource. If the FRU is a base level resource, then no additional checking is needed. On the other hand, if the FRU is a COD resource, the method may include checking the power records to see if the FRU has been powered on (decision block 905). For example, if one or more power event records 800 stored in the FRUID 95 indicate a power on event, the FRU has been powered on. If the power summary record 805 indicates that the power on hours have increased since the last check, the FRU has been powered on. If the FRU has been powered on (decision block 905—"yes" leg), the customer may be billed for the amount of time that the FRU was powered on (block 910). Otherwise, the check may end (with respect to this FRU) (decision block 905—"no" leg).

Figure 10:
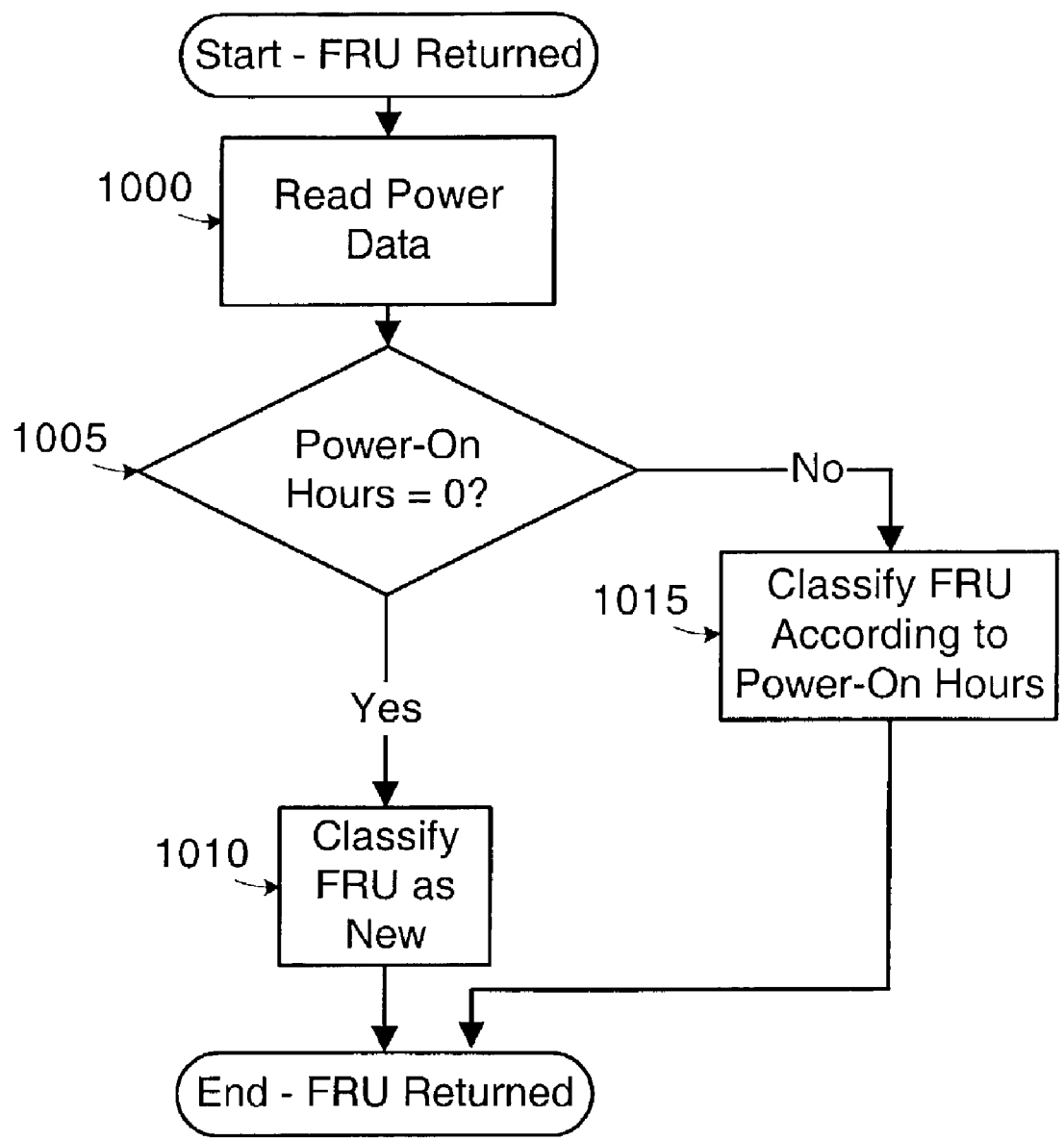
FIG. 10 is a flow diagram of one embodiment of a method used when a FRU is returned.

Other uses for the power data in conjunction with the COD mechanism are contemplated. For example, if a FRU is returned from the customer, it is possible the FRU was never powered on (since it may have been a FRU included for COD purposes but never requested). In some cases, it may be possible to classify the FRU as "new" (for resale purposes) if it has not been powered on. FIG. 10 is a flow diagram illustrating an example method that may be used when a FRU is returned.

The FRU may be powered on to read the FRUID 95 (block 1000). In particular, the power data may be read from the FRUID 95. The power data may be interpreted to determine if the power on hours of the FRU are zero (decision block 1005). For example, the duration in the power summary record 805 may indicate zero power-on hours. Furthermore, power event records 800 may not be found (or may not include any power-on events) if the power-on hours are zero. If the power-on hours are zero (decision block 1005—"yes" leg), the FRU may be classified as new (block 1010). If the power-on hours are not zero (decision block 1005—"no" leg), the FRU may be classified according to the power-on hours (block 1015). For example, FRUs may have different classifications (e.g. different amounts of expected remaining service life) dependent on the total amount of power-on hours of the FRU.

In other embodiments, a FRU (or submodule) that is a COD resource may be powered on when the system 10 is powered on, like other FRUs/submodules. For such embodiments, the power event records may not be usable for billing purposes. Some embodiments may employ fixed length licenses that expire after a period of time, and may bill for the fixed length of time (as described above). Other embodiments may employ a status event record (stored in the FRUID 95) to track usage of a COD resource.

Figure 11:
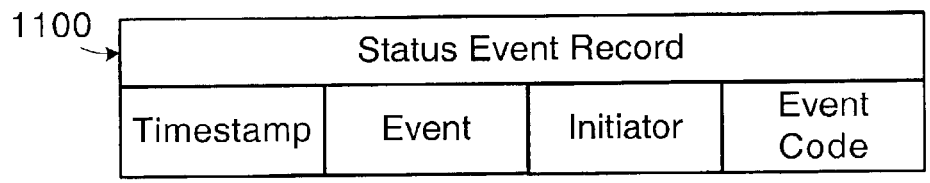
FIG. 11 is a block diagram illustrating one embodiment of a status event record.

FIG. 11 is a block diagram illustrating one embodiment of a status event record 1100. The status event record 1100 may be stored in the dynamic partition 205 of the FRUID 95. Generally, status event records may be used to record status changes in the FRU/submodule, including enabling and disabling of the FRU/submodule as well as various error scenarios. In the illustrated embodiment, the status event record 1100 may include a timestamp field, a status field, an initiator field, and an event code field. In various embodiments, other fields may be provided as well. For example, the following additional fields may be provided: a previous status field to store the status from a previous status event record; a component field identifying an affected component on the FRU, if applicable; and a message field to record a text message indicating reasons for the status change.

The timestamp may record the time at which the status change occurred. Thus, the difference in the timestamps between an enable event and a subsequent disable event may indicate the amount of time that a given FRU/submodule was in use. If the FRU/submodule is a COD resource, the timestamps may be used for billing purposes.

The status field may indicate the new status being recorded. The status field may include at least encodings to indicate that the FRU is enabled or disabled, and may include other encodings for other purposes.

The initiator field may indicate the initiator of the event that caused the status change. One encoding of the initiator field may indicate that the event was initiated to provide COD services. Other encodings may indicate errors that were detected, events due to human intervention (e.g. a service technician), various software initiators (e.g. the system controller 20 software, operating system software, driver software, etc.), etc.

The event code field may indicate the event that caused the status change. The event codes may include at least encodings representing enable and disable events, and may include events for error detection (software or hardware), diagnostic errors, human-detected errors, etc.

Figure 12:
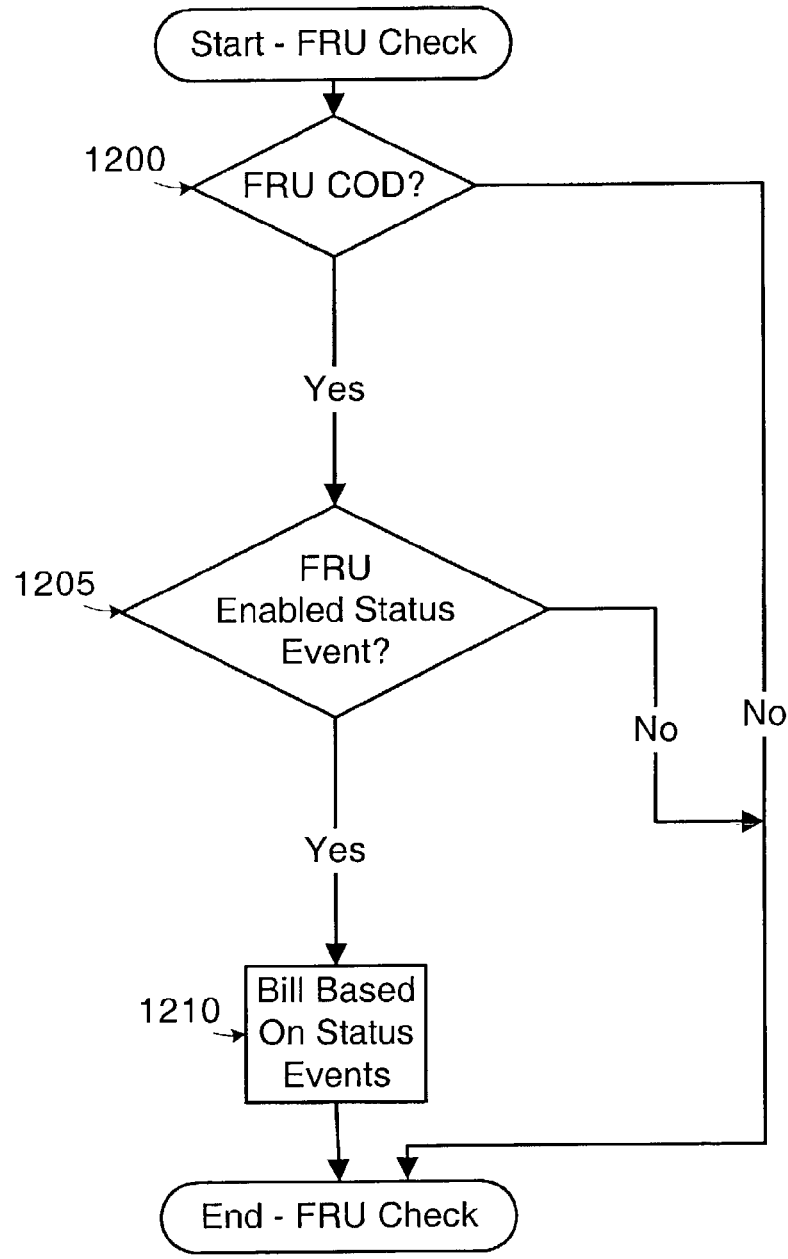
FIG. 12 is a flow diagram of one embodiment of a method for checking a COD FRU for billing purposes.

The initiator field indicating COD, and the event code field indicating enable or disable, may respectively indicate COD enable and disable events and thus may indicate the amount of time that a COD resource was in use. Such status event records may be used for billing purposes. An exemplary method is shown in FIG. 12. The method may be performed at any time (e.g. by the system controller 20, either automatically or at the request of a COD server). The method may also be performed when a FRU is returned or at a repair depot when a FRU is serviced. The method will be described in terms of checking a FRU, although a module on the FRU having its own FRUID may be checked in a similar fashion.

The method may include determining if the FRU is a COD FRU (decision block 1200) That is, the method may include checking the COD indication corresponding to the FRU to see if the FRU is a COD resource or a base level resource. If the FRU is a base level resource, then no additional checking is needed. On the other hand, if the FRU is a COD resource, the method may include checking the status event records to see if the FRU has been enabled at least once with a COD initiator (decision block 1205). If at least one such status event record is detected, the FRU has been used for COD (decision block 1205—"yes" leg). Thus, the customer may be billed for the amount of time that the FRU was used (block 1210). Generally, block 1210 may include scanning the status event records for COD enable and COD disable events, calculating the difference between the timestamp of a COD disable event and a preceding COD enable event, and summing the differences to generate a total usage time. The bill may then be generated based on a rate per period of time used, for example. If no COD enable status event records are detected, the check may end (with respect to this FRU) (decision block 1205—"no" leg).

A flexible capacity configuration arrangement, as described above, provides the user of the system 10 with greater capacity at a lower cost than the cost of a fully populated system 10. The user of the system 10 then pays only for the capacity that is utilized. The supplier of the system 10 also benefits by not having to make additional trips to the user's site to add or remove capacity.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:

powering on a system that includes a plurality of field replaceable units (FRUs) for supplying processing resources in the system, each of the plurality of FRUs having a field replaceable unit identification (FRUID) memory storing a capacity-on-demand (COD) indication associated with the FRU, the COD indication indicative of whether the FRU is a base level resource or a COD resource;

identifying a first subset of the plurality of FRUs, each FRU in the first subset having the COD indication in the FRUID memory indicating that the FRU is a base level resource available for use in the system;

identifying a second subset of the plurality of FRUs, each FRU in the second subset having the COD indication in the FRUID memory indicating that the FRU is a COD resource usable in the system in exchange for payment of a fee;

enabling the first subset;

identifying a need for additional processing resources; and enabling one or more FRUs from the second subset responsive to identifying the need for additional processing resources.

2. The method of claim 1 further comprising generating a component map indicative of the plurality of FRUs, wherein the enabling includes changing respective enable indications in the component map.

3. The method of claim 1 wherein at least some of the plurality of FRUs comprise two or more submodules, each submodule have a respective FRUID memory including a respective COD indication, wherein each submodule is individually indicated as being the base level resource or the COD resource using the respective COD indication.

4. The method of claim 3, wherein at least some of the submodules comprise processors.

5. The method of claim 3, wherein at least some of the submodules comprise memory devices.

6. The method of claim 3, wherein at least some of the submodules comprise input/output devices.

7. The method of claim 1, further comprising:

initiating a request for additional processing resources responsive to identifying the need for additional processing resources;

transmitting the request to a supplier of the computer system;

generating an authorization message responsive to the request; and transmitting the authorization message to the computer system, wherein enabling one or more FRUs from the second subset is further responsive to the authorization message.

8. The method of claim 1, further comprising generating a billing record for a user of the computer system responsive to enabling the one or more FRUs from the second subset.

9. The method of claim 8, wherein the generating is responsive to one or more power records in the FRUID memory of each of the plurality of FRUs indicated as COD resources.

10. The method of claim 8, wherein the generating is responsive to one or more status event records in the FRUID memory of each of the plurality of FRUs indicated as COD resources.

11. The method of claim 1, further comprising disabling the additional ones of the plurality of FRUs after a predetermined time interval.

12. The method of claim 1, further comprising monitoring a processing load of the computer system, wherein identifying the need for additional processing resources is responsive to the processing load exceeding a predetermined threshold.

13. A computer system, comprising:

a plurality of field replaceable units (FRUs) for supplying processing resources in the computer system, each of the plurality of FRUs having a field replaceable unit identification (FRUID) memory storing a capacity-on-demand (COD) indication associated with the FRU, the COD indication indicative of whether the FRU is a base level resource or a COD resource; and a system controller configured to access the FRUID memory of each of the plurality of FRUs to detect the COD indication, wherein the system controller is configured to enable those of the plurality of FRUs for which the corresponding COD indication indicates that the FRU is a base level resource available for use in the computer system, and wherein the system controller is further configured to identify a need for additional processing resources, wherein the system controller is configured to enable one or more additional ones of the plurality of FRUs responsive to identifying the need for additional processing resources, the one or more additional ones of the plurality of FRUs having the corresponding COD indication indicating that the FRU is a COD resource usable in the system in exchange for payment of a fee.

14. The system of claim 13, further comprising a component map for storing enable information regarding the plurality of FRUs, the system controller being configured to modify the component map to specify which of the plurality of FRUs are enabled and which of the plurality of FRUs are disabled.

15. The system of claim 13 wherein at least some of the plurality of FRUs comprise two or more submodules, each submodule have a respective FRUID memory including a respective COD indication, wherein each submodule is individually indicated as being the base level resource or the COD resource using the respective COD indication.

16. The system of claim 15, wherein at least some of the submodules comprise processors.

17. The system of claim 15, wherein at least some of the submodules comprise memory devices.

18. The system of claim 15, wherein at least some of the submodules comprise input/output devices.

19. The system of claim 13, wherein the system controller is configured to generate a billing record for a user of the computer system responsive to enabling the one or more additional ones of the plurality of FRUs.

20. The system of claim 19, wherein the system controller is configured to generate the billing record responsive to one or more power records in the FRUID memory of each of the plurality of FRUs indicated as COD resources.

21. The system of claim 19, wherein the system controller is configured to generate the billing record responsive to one or more status event records in the FRUID memory of each of the plurality of FRUs indicated as COD resources.

22. The system of claim 13, wherein the system controller is configured to disable the additional ones of the plurality of FRUs after a predetermined time interval.

23. The system of claim 13, wherein the system controller is configured to monitor a processing load of the computer system and identify the need for additional processing resources responsive to the processing load exceeding a predetermined threshold.

24. A system, comprising:
a capacity-on-demand server; and
a computer system communicatively coupled to the capacity-on-demand server, the computer system comprising:
a plurality of field replaceable units (FRUs) for supplying processing resources in the computer system, each of the plurality of FRUs having a field replaceable unit identification (FRUID) memory storing a capacity-on-demand (COD) indication associated with the FRU, the COD indication indicative of whether the FRU is a base level resource or a COD resource; and
a system controller configured to access the FRUID memory of each of the plurality of FRUs to detect the COD indication, wherein the system controller is configured to enable those of the plurality of FRUs for which the corresponding COD indication indicates that the FRU is a base level resource available for use in the computer system, and further configured to identify a need for additional processing resources, and wherein the system controller is configured to transmit a request for additional processing resources to the capacity-on-demand server and to receive an authorization message from the capacity-on-demand server responsive to the request, and wherein the system controller is configured to enable one or more additional ones of the plurality of FRUs responsive to the authorization message, the one or more additional ones of the plurality of FRUs having the corresponding COD indication indicating that the FRU is a COD resource usable in the system in exchange for payment of a fee.

25. The system of claim 24, wherein the capacity-on-demand server is communicatively coupled to the computer system via an internet connection.

26. The system of claim 24, wherein the capacity-on-demand server is communicatively coupled to the computer system via a modem connection.

27. The system of claim 24, wherein one of the system controller and the capacity-on-demand server is configured to generate a billing record for a user of the computer system responsive to the enabling of the one or more additional ones of the plurality of FRUs.

28. The system of claim 24, wherein the system controller is configured to disable the one or more additional ones of the plurality of FRUs after a predetermined time interval.

* * * * *

UNITED STATES PATENT AND TRADEMARK OFFICE
CERTIFICATE OF CORRECTION

| | | |
|---|---|---|
| PATENT NO. | : 7,716,334 B2 | Page 1 of 1 |
| APPLICATION NO. | : 10/412904 | |
| DATED | : May 11, 2010 | |
| INVENTOR(S) | : Shankar Prasad Venkoba Rao et al. | |

It is certified that error appears in the above-identified patent and that said Letters Patent is hereby corrected as shown below:

Title Page; item (56);
On page 2, in column 1, under "Other Publications", line 1, delete "Platrform" and insert -- Platform --, therefor.

On page 2, in column 1, under "Other Publications", line 5, delete "Platrform" and insert -- Platform --, therefor.

On page 2, in column 2, under "Other Publications", line 38, delete "Handboo," and insert -- Handbook, --, therefor.

In column 1, line 3, below title insert -- Related U.S. Application Data --, therefor.

In column 3, line 31, delete "returned." and insert -- returned; --, therefor.

In column 3, line 62, delete "data-bits" and insert -- data bits --, therefor.

Signed and Sealed this
Second Day of August, 2011

David J. Kappos
*Director of the United States Patent and Trademark Office*